(12) United States Patent
Kim et al.

(10) Patent No.: US 8,988,417 B2
(45) Date of Patent: Mar. 24, 2015

(54) RENDERING SYSTEM AND METHOD BASED ON WEIGHTED VALUE OF SUB-PIXEL REGION

(75) Inventors: Yun Tae Kim, Hwaseong-si (KR); Gee Young Sung, Daegu (KR); Dong Kyung Nam, Yongin-si (KR); Ju Yong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 13/064,659

(22) Filed: Apr. 6, 2011

(65) Prior Publication Data

US 2012/0019518 A1  Jan. 26, 2012

(30) Foreign Application Priority Data

Jul. 26, 2010 (KR) .................. 10-2010-0071841

(51) Int. Cl.
*G06T 15/00* (2011.01)
*H04N 13/04* (2006.01)

(52) U.S. Cl.
CPC ....... *H04N 13/0422* (2013.01); *H04N 13/0415* (2013.01)
USPC .......................................... 345/418; 345/613

(58) Field of Classification Search
USPC ........................................................ 345/419
See application file for complete search history.

(56) References Cited

U.S. PATENT DOCUMENTS

| 7,583,307 B2 * | 9/2009 | Oikawa et al. ........... 348/333.01 |
| 2005/0105179 A1 * | 5/2005 | Taira et al. .................... 359/463 |
| 2007/0018585 A1 * | 1/2007 | Ijzerman et al. ............... 315/15 |
| 2010/0149139 A1 * | 6/2010 | Kroll et al. .................... 345/204 |

FOREIGN PATENT DOCUMENTS

| JP | 2005-091448 | 4/2005 |
| JP | 2008-252450 | 10/2008 |
| KR | 1020070089137 | 8/2007 |
| KR | 1020070107973 | 11/2007 |
| KR | 1020070112081 | 11/2007 |

* cited by examiner

*Primary Examiner* — Mark Zimmerman
*Assistant Examiner* — Sohum Kaji
(74) *Attorney, Agent, or Firm* — NSIP Law

(57) ABSTRACT

A rendering system and method based on a weighted value of a sub-pixel region are provided. The rendering system may change a pixel value of a single sub-pixel using pixel values of sub-pixels that represent, as respective central viewpoints, a plurality of viewpoints represented by the single sub-pixel based on an inclined lens, and may perform rendering using the changed pixel value.

11 Claims, 8 Drawing Sheets

RENDERING SYSTEM AND METHOD BASED ON WEIGHTED VALUE OF SUB-PIXEL REGION

CROSS-REFERENCE TO RELATED APPLICATIONS

This application claims the priority benefit of Korean Patent Application No. 10-2010-0071841, filed on Jul. 26, 2010, in the Korean Intellectual Property Office, the disclosure of which is incorporated herein by reference.

BACKGROUND

1. Field

Example embodiments of the following description relate to a rendering system and method based on a weighted value of a sub-pixel region.

2. Description of the Related Art

To effectively implement a three-dimensional (3D) image, images having viewpoints different from each other may typically need to be respectively viewed by left/right eyes of human beings. To implement this 3D image without using a filter such as a glass, the 3D image may need to be spatially divided based on the viewpoints, which are referred to as an autostereoscopic display. In the autostereoscopic display, an image may be spatially divided using an optical device, and displayed. Here, as the optical device, optical lenses or an optical barrier may be representatively used. As an optical lens, a lenticular lens may be used by which respective pixel images are displayed only in a predetermined direction. In addition, using the optical barrier, only a predetermined pixel may be viewed from a predetermined direction due to a slit disposed in a front surface of a display. In a case of the autostereoscopic display using the lenses or the barrier, left/right viewpoint images, that is, two viewpoint images may be basically displayed, resulting in creation of a sweet spot having a significantly narrow width. The sweet spot may be expressed using a viewing distance and a viewing angle. Here, the viewing distance may be determined by a pitch of lenses or a slit, and the viewing angle may be determined by a number of expressible viewpoints. In this instance, a scheme of increasing the number of expressible viewpoints to widen the viewing angle may be referred to as an autostereoscopic multi-view display.

Accordingly, there is a desire for a rendering system and method that may more effectively provide a 3D image.

SUMMARY

The foregoing and/or other aspects are achieved by providing a rendering system including a pixel value providing unit to provide pixel values of sub-pixels, the sub-pixels representing a plurality of viewpoints as respective central viewpoints, and the plurality of viewpoints being represented by a single sub-pixel based on an inclined lens, a pixel value change unit to change a pixel value of the single sub-pixel using the provided pixel values, and a rendering unit to perform rendering using the changed pixel value.

The plurality of viewpoints represented by the single sub-pixel may be determined based on a pitch of the inclined lens and a slope of the inclined lens.

The rendering system may further include a ratio providing unit to provide a coverage ratio of each of the plurality of viewpoints with respect to the single sub-pixel. Here, the pixel value change unit may change the pixel value of the single sub-pixel by further using the provided coverage ratio.

The pixel value change unit may apply the provided coverage ratio, as a weighted value, to pixel values of sub-pixels corresponding to a corresponding viewpoint, and may change the pixel value of the single sub-pixel using the pixel values to which the provided coverage ratio is applied.

The pixel value change unit may change the pixel value of the single sub-pixel using pixel values of sub-pixels representing a same color as the single sub-pixel among the provided pixel values.

The rendering unit may perform the rendering by further using changed pixel values of sub-pixels representing, as central viewpoints, a same viewpoint as the single sub-pixel.

The foregoing and/or other aspects are achieved by providing a rendering method including providing pixel values of sub-pixels, the sub-pixels representing a plurality of viewpoints as respective central viewpoints, and the plurality of viewpoints being represented by a single sub-pixel based on an inclined lens, changing a pixel value of the single sub-pixel using the provided pixel values, and performing rendering using the changed pixel value.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 6 illustrates a diagram of a 16-view pixel rendering according to example embodiments;

FIG. 7 illustrates a diagram of a 48-view sub-pixel rendering according to example embodiments.

DETAILED DESCRIPTION

Figure 1:
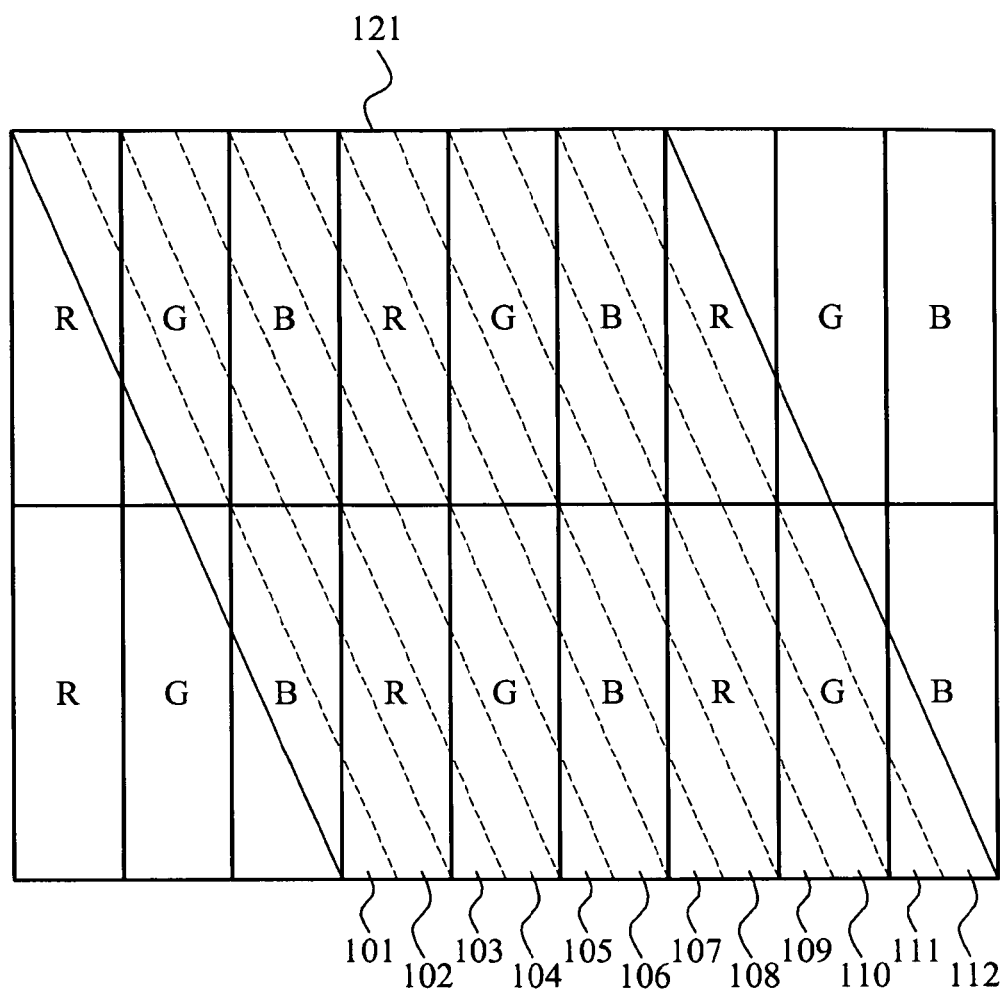
FIG. 1 illustrates a diagram of a plurality of sub-pixels and inclined lenses according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

A viewpoint image to be provided through a multi-view display may be displayed for each pixel unit, or for each sub-pixel unit. Here, the sub-pixel unit may be a minimal image display unit having a single piece of color information (for example, a unit to indicate each of red (R), green (G), and blue (B) in an RGB color space), and the pixel unit may be a minimal image display unit to express complete color information obtained by joining sub-pixels together (for example, R, G, and B sub-pixels being collectively considered together to be the single pixel).

FIG. 1 illustrates a plurality of sub-pixels and inclined lenses according to example embodiments. In FIG. 1, a plurality of rectangles may respectively indicate the plurality of sub-pixels, and the sub-pixels may be collected to form a single display. Additionally, "R", "G", and "B" in the rectangles may respectively indicate red, green, and blue in the RGB color space.

In FIG. 1, solid lines and dotted lines may schematically indicate lenses inclined on the display. For example, lenticular lenses may be used as the lenses. Here, a distance between the lines may indicate a pitch of the inclined lenses.

Additionally, two spaces formed between the solid lines and the dotted lines, and ten spaces formed among the dotted lines may respectively correspond to 12 viewpoints, for example a first viewpoint 101 through a twelfth viewpoint 112, as illustrated in FIG. 1.

Each of the sub-pixels of FIG. 1 may have influence on a plurality of viewpoints. For example, an R sub-pixel 121 representing a sixth viewpoint 106 as a central viewpoint may have influence on five viewpoints. Specifically, the R sub-pixel 121 may have influence on a fourth viewpoint 104, a fifth viewpoint 105, a seventh viewpoint 107, and an eighth viewpoint 108, as well as the sixth viewpoint 106.

Figure 2:
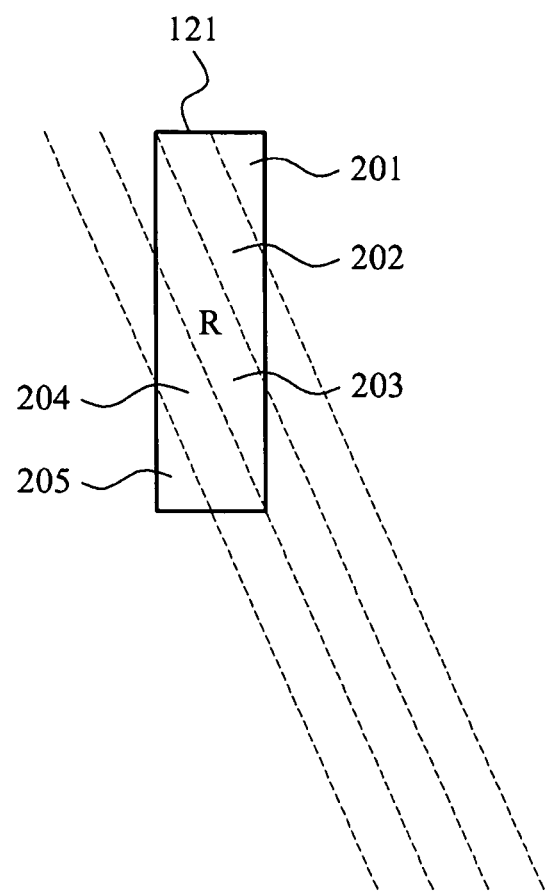
FIG. 2 illustrates a diagram of a single sub-pixel, and viewpoints associated with the single sub-pixel according to example embodiments.

FIG. 2 illustrates a single sub-pixel, and viewpoints associated with the single sub-pixel according to example embodiments. Specifically, FIG. 2 illustrates the R sub-pixel 121 representing the sixth viewpoint 106 as the center viewpoint, as described with reference to FIG. 1. As illustrated in FIG. 2, the R sub-pixel 121 may be divided into five regions, for example, a first region 201, a second region 202, a third region 203, a fourth region 204, and a fifth region 205 that respectively correspond to the eighth viewpoint 108, the seventh viewpoint 107, the sixth viewpoint 106, the fifth viewpoint 105, and the fourth viewpoint 104.

Here, a rendering system according to example embodiments may calculate a coverage ratio of each of the fourth viewpoint 104 through the eighth viewpoint 108 with respect to the R sub-pixel 121, based on areas of the first region 201 through the fifth region 205. For example, when the total area of the R sub-pixel 121 is set to be "1", each of the first region 201 and the fifth region 205 occupies "1/12" of the total area, each of the second region 202 and the fourth region 204 occupies "1/4" of the total area, and the third 203 occupies "1/3" of the total area. Accordingly, coverage ratios of the fourth viewpoint 104 through the eighth viewpoint 108 with respect to the R sub-pixel 121 may be respectively calculated as "1/12", "1/4", "1/3", "1/4", and "1/12".

Additionally, the rendering system may change a pixel value of the R sub-pixel 121 based on the calculated ratio, and based on pixel values of sub-pixels representing the fourth viewpoint 104 through the eighth viewpoint 108 as central viewpoints. The pixel value of the R sub-pixel 121 may be changed based on the below Equation 1, for example.

$$r'_6 = \frac{1}{3}r_6 + \frac{1}{4}r_5 + \frac{1}{12}r_4 + \frac{1}{4}r_7 + \frac{1}{12}r_8 \quad \text{Equation 1}$$

First, "$r_n$" may denote a pixel value of a sub-pixel representing an "n"-th viewpoint as a central viewpoint. For example, "$r_6$" may denote the pixel value of the R sub-pixel 121 representing the sixth viewpoint 106 as the central viewpoint, and "$r_5$" may denote a pixel value of a sub-pixel representing the fifth viewpoint 105 as a central viewpoint. Additionally, "$r_6'$" may denote a changed pixel value of the R sub-pixel 121 representing the sixth viewpoint 106 as the central viewpoint. Furthermore, each of fractional numbers may indicate a coverage ratio of each of the viewpoints with respect to a single sub-pixel as described above. The coverage ratio may be calculated based on a ratio of an area of the sub-pixel on which a lens is superimposed to the total area of the sub-pixel.

Accordingly, a pixel value of a single sub-pixel may be changed based on pixel values of sub-pixels representing viewpoints as central viewpoints. Here, the viewpoints may be influenced by the single sub-pixel. Rendering may be performed using the changed pixel value, thereby reducing a color distortion caused by using inclined lenses.

Figure 3:
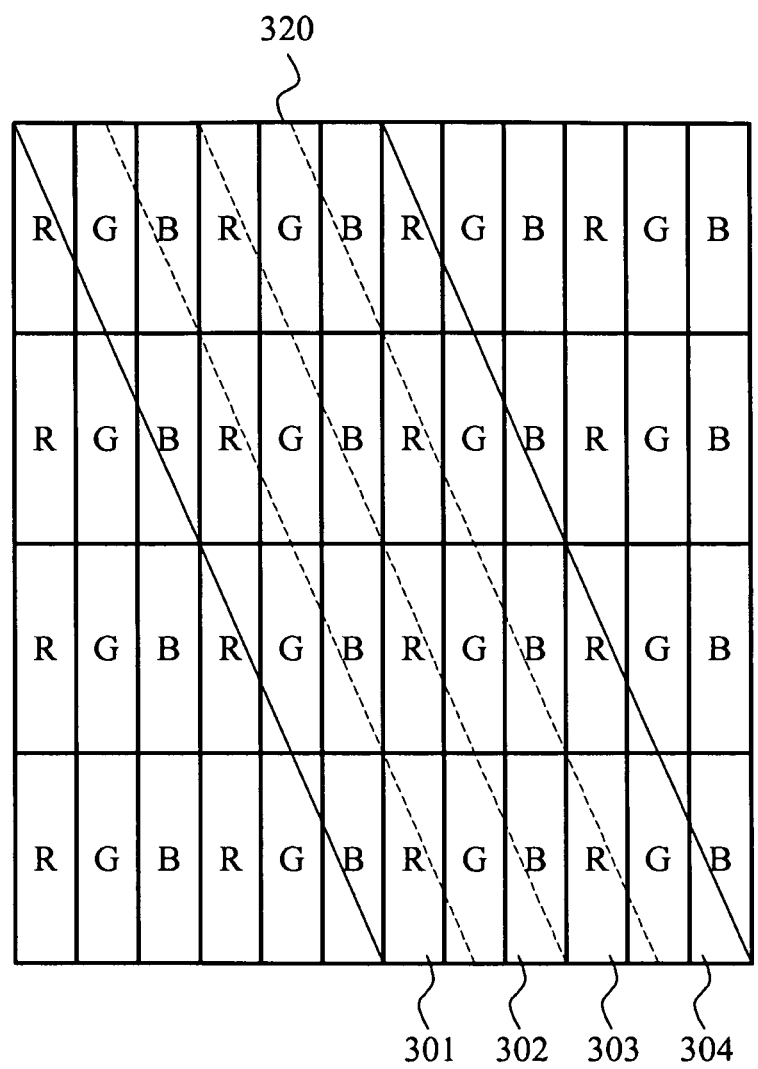
FIG. 3 illustrates a diagram of a 4-view pixel rendering according to example embodiments.

FIG. 3 illustrates a 4-view pixel rendering according to example embodiments. Specifically, FIG. 3 illustrates sub-pixels and lenses for the 4-view pixel rendering in a display with four viewpoints. A pixel rendering may include a scheme of performing rending to display a single viewpoint image using all three types of sub-pixels, for example an R sub-pixel, a G sub-pixel, and a B sub-pixel. In other words, a first viewpoint 301, a second viewpoint 302, a third viewpoint 303, and a fourth viewpoint 304 of FIG. 3 may be respectively represented as central viewpoints of R, G, and B sub-pixels. Here, a single sub-pixel may have influence on a plurality of viewpoints. For example, a G sub-pixel 320 among sub-pixels representing the third viewpoint 303 as central viewpoints may have influence on the second viewpoint 302 and the fourth viewpoint 304, in addition to the third viewpoint 303, as illustrated in FIG. 3. In other words, the G sub-pixel 320 may be used to represent the second viewpoint 302 through the fourth viewpoint 304.

In the 4-view pixel rendering, a single viewpoint image may be displayed for each pixel unit. In other words, the R, G, and B sub-pixels of FIG. 3 may be collected to form a single pixel, and a single viewpoint may be represented by the R, G, and B sub-pixels. Here, pixel values of the R, G, and B sub-pixels of FIG. 3 may be changed using the below Equation 2, for example.

$$\begin{cases} g'_n = \frac{5}{6}g_n + \frac{1}{12}g_{n-1} + \frac{1}{12}g_{n+1} \\ b'_n = \frac{2}{3}b_n + \frac{1}{3}b_{n-1} \\ r'_n = \frac{2}{3}r_n + \frac{1}{3}r_{n+1} \end{cases} \quad \text{Equation 2}$$

if $n < 1$ $n = n + 4$ else if $n > 4$ $n = n \, \%4$

Here, "$g_n$", "$b_n$", and "$r_n$" may respectively denote pixel values of G, B, and R sub-pixels that represent an "n"-th viewpoint as central viewpoints. For example, "$g_3$" may denote a pixel value of a G sub-pixel used to express a green color component among G, B, and R sub-pixels that represent the third viewpoint 303 as central viewpoints. Additionally, "$g_n'$", "$b_n'$", and "$r_n'$" may respectively denote changed pixel values of the G, B, and R sub-pixels that represent the "n"-th viewpoint as central viewpoints. In other words, the pixel rendering may be performed using changed pixel values of sub-pixels that represent a single viewpoint as central viewpoints. Furthermore, each of fractional numbers may denote a coverage ratio of each of viewpoints with respect to a single sub-pixel. For example, "1/12" in front of "$g_{n-1}$" may denote a coverage ratio of an "n−1"-th viewpoint with respect to a G sub-pixel corresponding to "$g_n$". Here, the "n−1"-th viewpoint may be expressed by "$g_n$". In this example, the coverage ratio may be calculated based on a ratio of an area of the sub-pixel on which a lens is superimposed to the total area of the sub-pixel.

Figure 4:
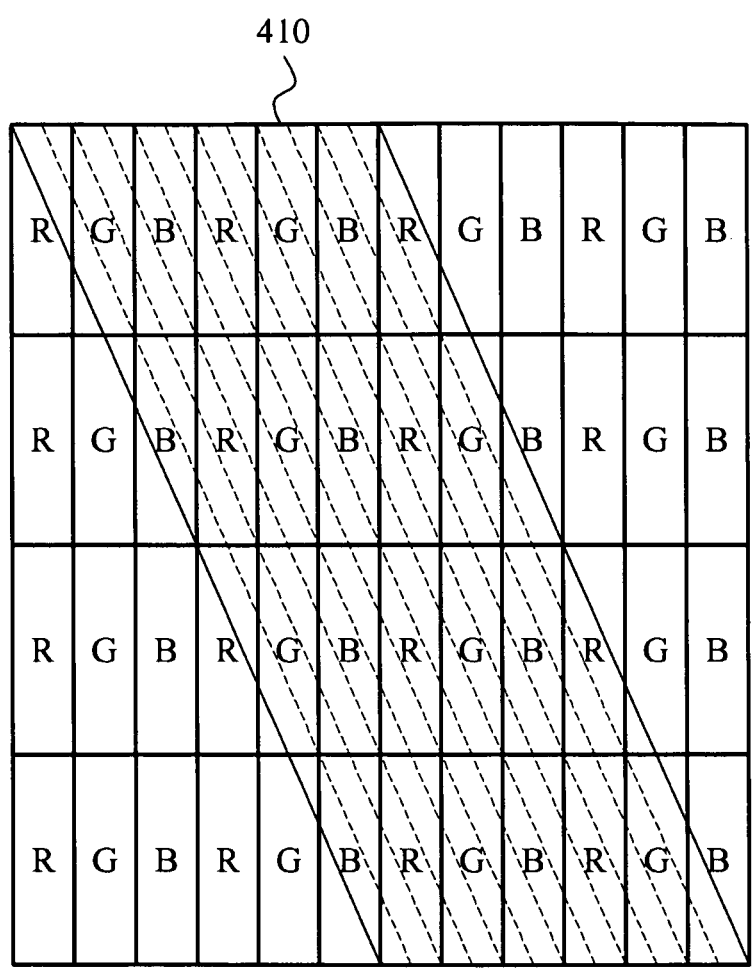
FIG. 4 illustrates a diagram of a 12-view sub-pixel rendering according to example embodiments according to example embodiments.

FIG. 4 illustrates a 12-view sub-pixel rendering according to example embodiments. Specifically, FIG. 4 illustrates sub-pixels and lenses for the 12-view sub-pixel rendering in a display with 12 viewpoints. A sub-pixel rendering may include a scheme of performing rendering to display a single viewpoint image using each of R, G, and B sub-pixels. In other words, the 12 viewpoints of FIG. 4 may be respectively represented as central viewpoints of R, G, and B sub-pixels. For example, an eighth viewpoint may be represented as a central viewpoint of a G sub-pixel 410, as illustrated in FIG. 4. In this example, the G sub-pixel 410 may have influence on some viewpoints other than eighth viewpoint. Specifically, the G sub-pixel 410 may have influence on five viewpoints, for example a sixth viewpoint through a tenth viewpoint. In other words, the G sub-pixel 410 may be used to represent the five viewpoints.

In the 12-view sub-pixel rendering, a single viewpoint image may be displayed for each sub-pixel unit. In other words, each of the R, G, and B sub-pixels of FIG. 4 may be used to represent a single viewpoint. Here, pixel values of the R, G, and B sub-pixels of FIG. 4 may be changed using the below Equation 3, for example.

$$x'_n = \frac{1}{3}x_n + \frac{1}{4}x_{n-1} + \frac{1}{12}x_{n-2} + \frac{1}{4}x_{n+1} + \frac{1}{12}x_{n+2} \quad \text{Equation 3}$$

$x \in \{r, g, b\}$ if $n < 1$ $n = n + 12$ else if $n > 12$ $n = n \% 12$

Here, "$x_n$" may denote a pixel value of a sub-pixel that represents an "n"-th viewpoint as a central viewpoint. For example, "$x_3$" may denote a pixel value of a sub-pixel that represents a third viewpoint as a central viewpoint. Additionally, "$x_n'$" may denote a changed pixel value of the sub-pixel that represents the "n"-th viewpoint as the central viewpoint. In other words, the sub-pixel rendering may be performed using a changed pixel values of a sub-pixel that represents a corresponding viewpoint as a central viewpoint. Furthermore, each of fractional numbers may indicate a coverage ratio of each of viewpoints with respect to a single sub-pixel as described above. The coverage ratio may be calculated based on a ratio of an area of the sub-pixel on which a lens is superimposed to the total area of the sub-pixel.

As described above with reference to FIGS. 3 and 4, in the pixel rendering and the sub-pixel rendering, a pixel value of a single sub-pixel may be changed based on a number of viewpoints that may be represented by the single sub-pixel, and based on a coverage ratio of each of the viewpoints with respect to the single sub-pixel, and the rendering may be performed based on the changed pixel value. Here, the number of viewpoints and the coverage ratio may be determined based on a pitch of a lens and a slope of the lens.

FIGS. 1 through 4 merely illustrate examples, and the number of viewpoints and the coverage ratio may vary based on the pitch of the lens and the slope of the lens and thus, a scheme of changing a pixel value of a sub-pixel may be generalized and expressed by the below Equation 4.

$$x_n' = \ldots \alpha_n x_n + \alpha_{n-1} x_{n-1} + \alpha_{n-2} x_{n-2} + \alpha_{n+1} x_{n+1} + \alpha_{n+2} x_{n+2} \quad \text{Equation 4}$$

if n<1 n=n+N else if n>N n=n % N

Here, in the case of the sub-pixel rendering, "x" may denote a component of a set including R, G, and B color components, that is, may denote a color of a sub-pixel representing a corresponding viewpoint as a central viewpoint. Additionally, in the case of the pixel rendering, "x" may denote a same color as a color of a sub-pixel having a pixel value to be changed among R, G, and B sub-pixels. Furthermore, "N" may denote a total number of viewpoints, and "α" may denote a weighted value based on a coverage ratio of a viewpoint with respect to a sub-pixel.

Figure 5:
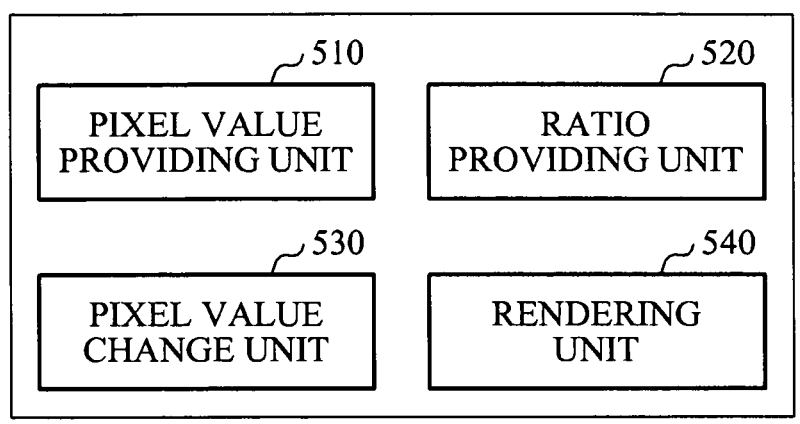
FIG. 5 illustrates a block diagram of a rendering system according to example embodiments.

FIG. 5 illustrates a block diagram of a rendering system 500 according to example embodiments. The rendering system 500 may include a pixel value providing unit 510, a pixel value change unit 530, and a rendering unit 540.

The pixel value providing unit 510 may provide pixel values of sub-pixels that represent a plurality of viewpoints as respective central viewpoints. Here, the plurality of viewpoints may be represented based on an inclined lens by a single sub-pixel. The plurality of viewpoints represented by the single sub-pixel may be determined based on a pitch of the inclined lens and a slope of the inclined lens. In other words, the pixel value providing unit 510 may provide the pixel values of the sub-pixels that represent, as central viewpoints, the viewpoints determined based on the pitch and the slope of the inclined lens.

The pixel value change unit 530 may change a pixel value of a single sub-pixel using the provided pixel values. For example, the pixel value change unit 530 may determine, as a pixel value to be changed, a result of an operation between the provided pixel values.

Here, during the operation, a weighted value may be applied to each of the pixel values. To apply the weighted value, the rendering system 500 may further include a ratio providing unit 520, as illustrated in FIG. 5.

The ratio providing unit 520 may provide a coverage ratio of each of the plurality of viewpoints with respect to the single sub-pixel. Here, the pixel value change unit 530 may change the pixel value of the single sub-pixel by further using the provided coverage ratio. For example, the pixel value change unit 530 may apply the provided coverage ratio, as a weighted value, to pixel values of sub-pixels corresponding to a corresponding viewpoint, and may change the pixel value of the single sub-pixel using the pixel values to which the provided coverage ratio is applied, through Equation 4 as described above. Here, the coverage ratio may be calculated as a ratio of an area occupied by each of the viewpoints with respect to a single pixel value, and may be calculated based on a ratio of an area of the sub-pixel on which a lens is superimposed to the total area of the sub-pixel.

The coverage ratio is merely an example and accordingly, another element may be used as a weighted value. For example, a weighted value based on a distance from a central viewpoint among all weighted values to indicate a proportion of viewpoints with respect to a single pixel may be used to change a pixel value.

Additionally, in the case of pixel rendering, the pixel value change unit 530 may change the pixel value of the single sub-pixel using pixel values of sub-pixels representing the same color as the single sub-pixel among the provided pixel values. In other words, in the case of the sub-pixel rendering, a single sub-pixel may represent a single viewpoint as a central viewpoint, whereas in the case of the pixel rendering, a plurality of sub-pixels may represent a single viewpoint as central viewpoints. Accordingly, the pixel value change unit 530 may use only pixel values of sub-pixels representing the same color as a sub-pixel of which a pixel value is to be changed, among pixel values provided for pixel rendering. Here, the weighted value may equally be applied to the pixel values of the sub-pixels representing the same color as the sub-pixel, and the pixel value to be changed may be calculated through an operation between the pixel values to which the weighted value is applied.

The rendering unit 540 may perform rendering using the changed pixel value. Specifically, the rendering unit 540 may perform pixel rendering by using a pixel value of a single sub-pixel, and by further using changed pixel values of sub-pixels that represent, as central viewpoints, a same viewpoint as the single sub-pixel. In other words, to perform rendering with respect to a single viewpoint, pixel values of all sub-pixels representing the corresponding viewpoint as central viewpoints may be changed. The rendering unit 540 may perform pixel rendering using the changed pixel values. One of all known schemes of rendering pixels or sub-pixels may be used to perform rendering based on a provided pixel value.

Most of the operations have already been described and hence, repeated descriptions of FIG. 5 are deemed redundant, and accordingly, will be omitted.

Figure 6:
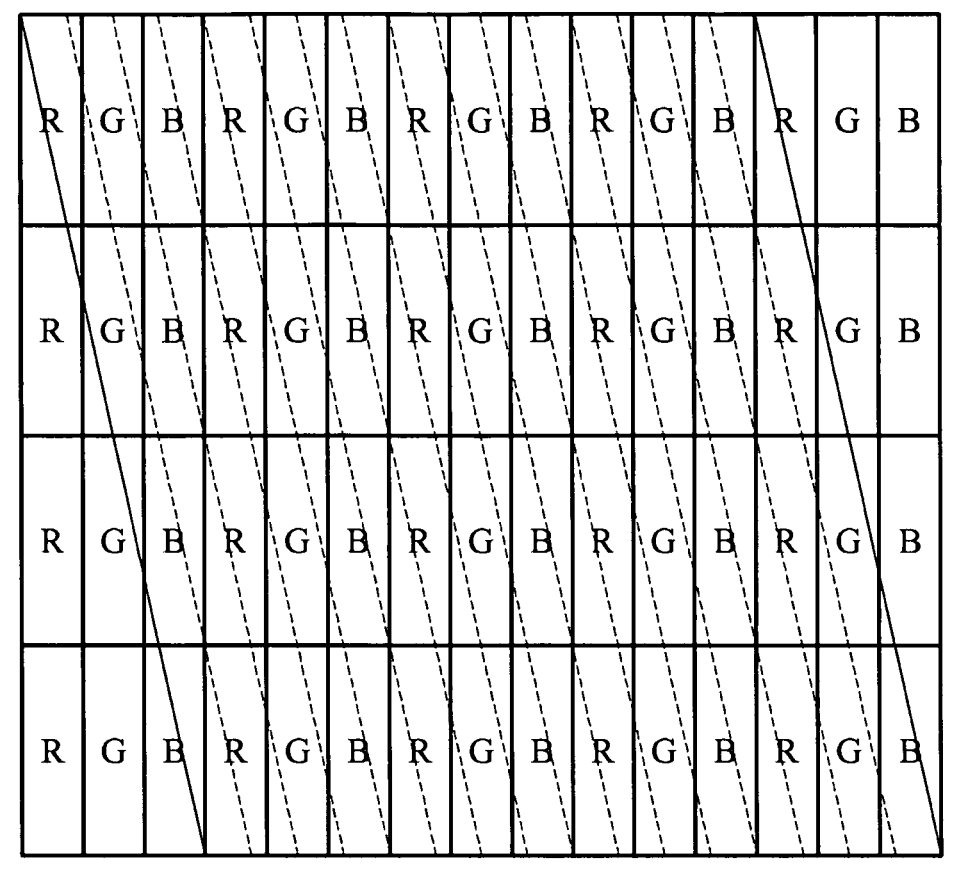

FIG. 6 illustrates a 16-view pixel rendering according to example embodiments. Specifically, FIG. 6 illustrates sub-pixels and lenses for the 16-view pixel rendering in a display with 16 viewpoints.

In the 16-view pixel rendering, a single viewpoint image may be displayed for each pixel unit, as described above. In other words, the R, G, and B sub-pixels of FIG. 6 may be collected to form a single pixel, and a single viewpoint may be represented by the R, G, and B sub-pixels. Here, pixel values of the R, G, and B sub-pixels of FIG. 6 may be changed using the below Equation 5, for example. The generalized Equation 4 has been already provided, however, a changed pixel value of each of the R, G, and B sub-pixels to represent a single viewpoint may be expressed by Equation 5, in order to facilitate understanding of description.

$$\begin{cases} g'_n = \frac{2}{3}g_n + \frac{1}{6}g_{n-1} + \frac{1}{6}g_{n+1} \\ b'_n = \frac{7}{12}b_n + \frac{1}{24}b_{n-1} + \frac{9}{24}b_{n+1} \\ r'_n = \frac{7}{12}r_n + \frac{9}{12}r_{n-1} + \frac{1}{24}r_{n+1} \end{cases} \quad \text{Equation 5}$$

if $n < 1$ $n = n + 16$ else if $n > 16$ $n = n$ %16

Here, "$g_n$", "$b_n$", and "$r_n$" respectively denote pixel values of G, B, and R sub-pixels that represent an "n"-th viewpoint as central viewpoints. Additionally, "$g_n'$", "$b_n'$", and "$r_n'$" respectively denote changed pixel values of the G, B, and R sub-pixels that represent the "n"-th viewpoint as central viewpoints. In other words, the pixel rendering may be performed using changed pixel values of sub-pixels that represent a single viewpoint as central viewpoints. Furthermore, each of fractional numbers may denote a coverage ratio of each of viewpoints with respect to a single sub-pixel. For example, "⅙" in front of "$g_{n-1}$" denote a coverage ratio of an "n−1"-th viewpoint with respect to a G sub-pixel corresponding to "$g_n$". Here, the "n−1"-th viewpoint may be expressed by "$g_n$". In this example, the coverage ratio may be calculated based on a ratio of an area of the sub-pixel on which a lens related to the "n−1"-th viewpoint is superimposed to the total area of the sub-pixel.

Figure 7:
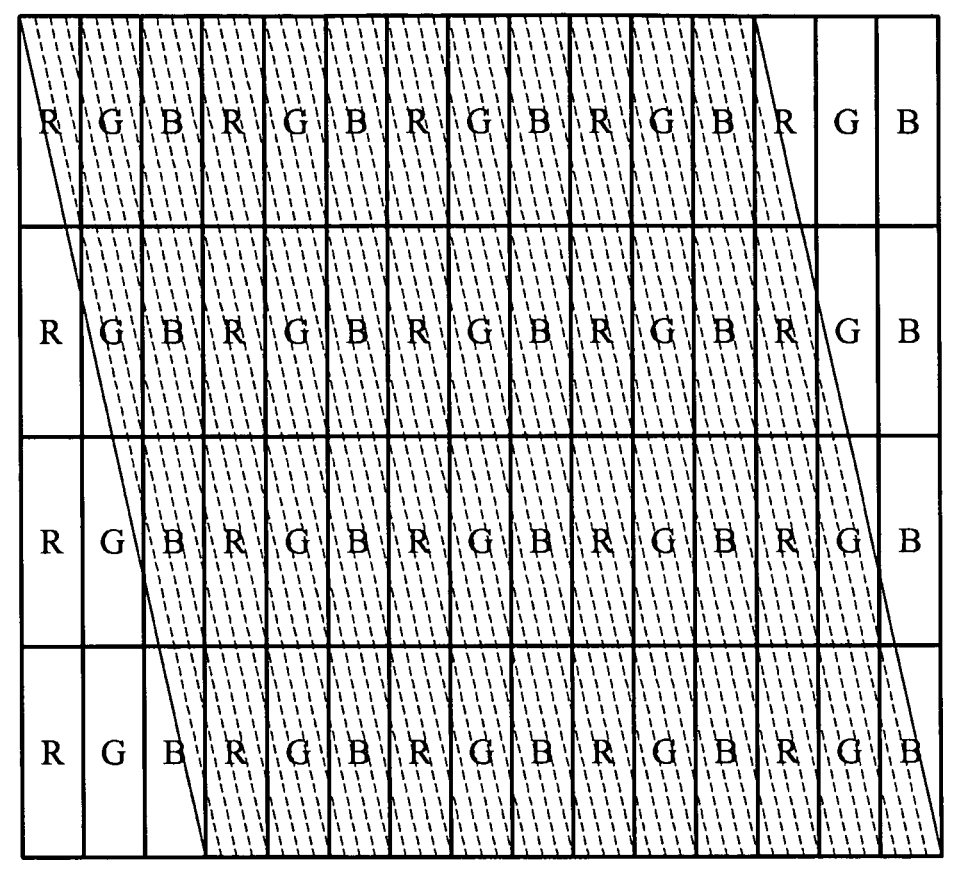

FIG. 7 illustrates a 48-view sub-pixel rendering according to example embodiments. Specifically, FIG. 7 illustrates sub-pixels and lenses for the 48-view sub-pixel rendering in a display with 48 viewpoints.

In the 48-view sub-pixel rendering, a single viewpoint image may be displayed for each sub-pixel unit. In other words, each of the R, G, and B sub-pixels of FIG. 7 may be used to represent a single viewpoint. Here, pixel values of the R, G, and B sub-pixels may be changed using the below Equation 6, for example.

$$x'_n = \frac{1}{4}x_n + \frac{5}{24}x_{n-1} + \frac{1}{8}x_{n-2} + \quad \text{Equation 6}$$

$$\frac{1}{24}x_{n-3} + \frac{5}{24}x_{n+1} + \frac{1}{8}x_{n+2} + \frac{1}{24}x_{n+3}$$

$x \in \{r, g, b\}$ if $n < 1$ $n = n + 48$ else if $n > 48$ $n = n$ %48

Symbols in Equation 6 have already been described in detail and accordingly, further descriptions thereof will be omitted.

Figure 8:
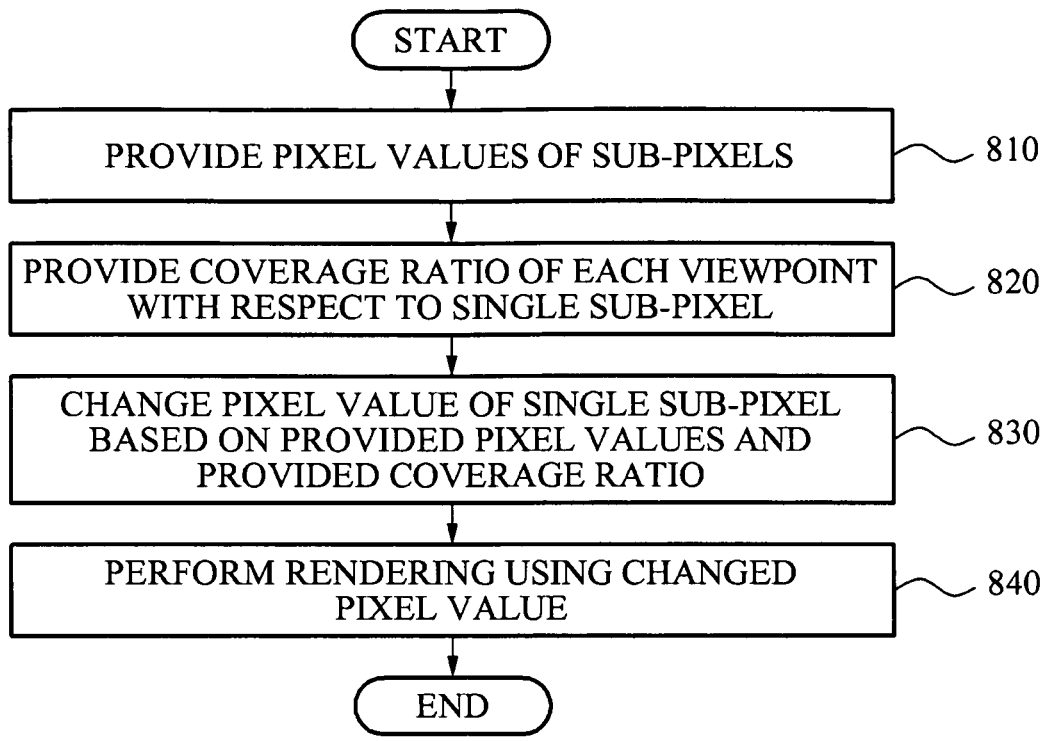
FIG. 8 illustrates a flowchart of a rendering method according to example embodiments.

FIG. 8 illustrates a flowchart of a rendering method according to example embodiments. The rendering method according to example embodiments may be performed by the rendering system 500 of FIG. 5. Hereinafter, operations of the rendering method performed by the rendering system 500 will be described with reference to FIG. 8.

In operation 810, the rendering system 500 may provide pixel values of sub-pixels that represent a plurality of viewpoints as respective central viewpoints. Here, the plurality of viewpoints may be represented based on an inclined lens by a single sub-pixel. The plurality of viewpoints represented by the single sub-pixel may be determined based on a pitch of the inclined lens and a slope of the inclined lens. In other words, the rendering system 500 may provide the pixel values of the sub-pixels that represent, as central viewpoints, the viewpoints determined based on the pitch and the slope of the inclined lens.

In operation 820, the rendering system 500 may provide a coverage ratio of each of the plurality of viewpoints with respect to the single sub-pixel. Here, the coverage ratio may be calculated as a ratio of an area occupied by each of the viewpoints with respect to a single pixel value, and may be calculated based on a ratio of an area of the sub-pixel on which a lens is superimposed to the total area of the sub-pixel.

In operation 830, the rendering system 500 may change a pixel value of a single sub-pixel based on the provided pixel values and the provided coverage ratio. For example, the rendering system 500 may apply the provided coverage ratio, as a weighted value, to pixel values of sub-pixels corresponding to a corresponding viewpoint, and may change the pixel value of the single sub-pixel using the pixel values to which the provided coverage ratio is applied, through Equation 4 as described above.

Additionally, in the case of pixel rendering, the rendering system 500 may change the pixel value of the single sub-pixel using pixel values of sub-pixels representing the same color as the single sub-pixel among the provided pixel values. In other words, in the case of the sub-pixel rendering, a single sub-pixel may represent a single viewpoint as a central viewpoint, whereas in the case of the pixel rendering, a plurality of sub-pixels may represent a single viewpoint as central viewpoints. Accordingly, the rendering system 500 may use only pixel values of sub-pixels representing the same color as a sub-pixel of which a pixel value is to be changed, among pixel values provided for pixel rendering. Here, the weighted value may equally be applied to the pixel values of the sub-pixels representing the same color as the sub-pixel, and the pixel value to be changed may be calculated through an operation between the pixel values to which the weighted value is applied.

Here, operation 820 may be omitted. In other words, another weighted value, instead of the coverage ratio, may be used for an operation of changing a pixel value. For example, a weighted value based on a distance from a central viewpoint among all weighted values to indicate a proportion of viewpoints with respect to a single pixel may be used to change a pixel value In operation 840, the rendering system 500 may perform rendering using the changed pixel value. Specifically, the rendering system 500 may perform pixel rendering by using a pixel value of a single sub-pixel, and by further using changed pixel values of sub-pixels that represent, as central viewpoints, the same viewpoint as the single sub-pixel. In other words, to perform rendering with respect to a single viewpoint, pixel values of all sub-pixels representing the single viewpoint as central viewpoints may be changed. The rendering system 500 may perform pixel rendering using the changed pixel values. One of all known schemes of rendering pixels or sub-pixels may be used to perform rendering based on a provided pixel value.

Most of the operations have already been described and hence, repeated descriptions of FIG. 8 are deemed redundant, and accordingly, will be omitted.

As described above, according to example embodiments, a pixel value of a single sub-pixel that represents multiple viewpoints may be changed using pixel values of sub-pixels corresponding to neighboring viewpoints that are influenced by the single sub-pixel, thereby preventing a color from being distorted during rendering.

Additionally, according to example embodiments, a weighted value based on a coverage ratio of an inclined lens with respect to a single sub-pixel that represents multiple viewpoints may be applied to pixel values of sub-pixels corresponding to neighboring viewpoints that are influenced by the single sub-pixel. A pixel value of the single sub-pixel may be changed using the pixel values to which the weighted value is applied. Thus, it is possible to prevent a color from being distorted during rendering.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A display apparatus, comprising:
at least one processor which provides:
a ratio providing unit to provide a coverage ratio of each of a plurality of viewpoints with respect to a single sub-pixel, wherein the plurality of viewpoints is represented by a single sub-pixel based on a pitch and a slope of an inclined lens, and the coverage ratio of each of the plurality of viewpoints ranges between 0 and 1;
a pixel value providing unit to provide a pixel value of the single sub-pixel changed based on the provided coverage ratio and pixel values of sub-pixels, wherein the sub-pixels represent a plurality of viewpoints as respective central viewpoints.

2. The display apparatus of claim 1, wherein the pixel value providing unit provides the pixel value of the single sub-pixel change based on pixel values of sub-pixels corresponding to a corresponding viewpoint to which the provided coverage ratio is applied as a weighted value.

3. The display apparatus of claim 1, wherein the pixel value providing unit provides the pixel value of the single sub-pixel changed based on pixel values of sub-pixels representing the same color as the single sub-pixel among the provided pixel values.

4. The display apparatus of claim 1, wherein the display apparatus performs the rendering by further using changed pixel values of sub-pixels representing, as central viewpoints, the same viewpoint as the single sub-pixel.

5. The display apparatus of claim 1, wherein:
the at least one processor further provides a weight value providing unit to provide a weight value based on a distance from a central viewpoint among all weighted values to indicate a proportion of viewpoints with respect to the single sub-pixel, and
the pixel value providing unit provides the pixel value of the single sub-pixel changed by further using the provided weight value.

6. A rendering method to be performed by a display apparatus, comprising:
providing a coverage ratio of each of a plurality of viewpoints with respect to a single sub-pixel, wherein the plurality of viewpoints is represented by a single sub-pixel based on a pitch and a slope of an inclined lens, and the coverage ratio of each of the plurality of viewpoints ranges between 0 and 1;
providing a pixel value of the single sub-pixel changed based on the provided coverage ratio; wherein the sub-pixels represent a plurality of viewpoints as respective central viewpoints.

7. The rendering method of claim 6, wherein the ratio comprise: providing the pixel value of the single sub-pixel changed based on pixel values of sub-pixels corresponding to a corresponding viewpoint, to which the provided coverage ratio is applied as a weighted value.

8. The rendering method of claim 6, wherein the providing the pixel value of the single sub-pixel changed based on pixel values of sub-pixels representing the same color as the single sub-pixel among the provided pixel values.

9. The rendering method of claim 6, wherein the display apparatus performs rendering by further using changed pixel values of sub-pixels representing, as central viewpoints, the same viewpoint as the single sub-pixel.

10. The rendering method of claim 6, further comprising:
providing a weight value based on a distance from a central viewpoint among all weighted values to indicate a proportion of viewpoints with respect to the single sub-pixel,
wherein the providing the pixel value of the single sub-pixel further comprises using the provided weight value.

11. A non-transitory computer readable recording medium storing a program to cause a computer to implement the method of claim 6.

* * * * *